United States Patent
Tang et al.

(10) Patent No.: US 10,810,362 B2
(45) Date of Patent: Oct. 20, 2020

(54) PAGE-BASED INCIDENT CORRELATION FOR NETWORK APPLICATIONS

(71) Applicant: SAP SE, Waldorf (DE)

(72) Inventors: Simon Tang, Shanghai (CN); Xiao Xu, Wujiang (CN); William Cui, Shanghai (CN); Nate Wang, Shanghai (CN); Jianrong Yu, Shanghai (CN); Luis Lu, Shanghai (CN); Jonny Chen, Shanghai (CN); Ming-hui Cao, Shanghai (CN); Walton Wang, Shanghai (CN); Frank Fan, Shanghai (CN); Ufo Qiao, Shanghai (CN); Linda Xu, Shanghai (CN)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 14/802,721

(22) Filed: Jul. 17, 2015

(65) Prior Publication Data
US 2017/0017631 A1    Jan. 19, 2017

(51) Int. Cl.
*G06F 17/22*    (2006.01)
*G06F 17/24*    (2006.01)
(Continued)

(52) U.S. Cl.
CPC ........ *G06F 40/169* (2020.01); *G06F 16/1734* (2019.01); *G06F 16/245* (2019.01); *G06F 40/14* (2020.01); *G06Q 10/10* (2013.01)

(58) Field of Classification Search
CPC ............. G06F 11/0766; G06F 11/0769; G06F 11/0775; G06F 11/321; G06F 11/326;
(Continued)

(56) References Cited

U.S. PATENT DOCUMENTS 7,380,214 B1    5/2008    Giormov et al.
7,437,722 B2    10/2008   Poole et al.
(Continued)

OTHER PUBLICATIONS

Liang et al. (SeeSS: Seeing What I Broke—Visualizing Change Impact of Cascading Style Sheets (CSS), published Oct. 2013, pp. 1-4).*

(Continued)

*Primary Examiner* — Stephen S Hong
*Assistant Examiner* — Ahamed I Nazar
(74) *Attorney, Agent, or Firm* — Klarquist Sparkman, LLP

(57) ABSTRACT

An information collection module receives an incident report request from a user of a browser running a network application on a client system to thereby provide a page in the browser. The information collection module collects incident data including user interactions with the page, client system features and operations associated with executing the network application, and a document object model (DOM) of the page. An annotation tool of the network application receives annotations of the page from the user for inclusion in the incident data, and a server-side incident manager receives the incident data. The server-side incident manager includes a rendering engine that renders the document object model and the annotations, and an incident analyzer that displays the collected user interactions, and client system features and operations, and the rendered document object model and annotations.

16 Claims, 6 Drawing Sheets

(51) Int. Cl.
*G06F 17/30* (2006.01)
*G06F 40/169* (2020.01)
*G06F 16/245* (2019.01)
*G06F 16/17* (2019.01)
*G06Q 10/10* (2012.01)
*G06F 40/14* (2020.01)

(58) Field of Classification Search
CPC .. G06F 17/2247; G06F 17/248; G06F 17/218; G06F 40/169; G06F 40/14; G06F 16/245; G06F 16/1734; G06Q 10/10; H04L 67/02; H04L 67/26
See application file for complete search history.

(56) References Cited

U.S. PATENT DOCUMENTS

| | | | |
|---|---|---|---|
| 7,526,681 B2 | 4/2009 | Anafi et al. | |
| 7,840,944 B2 | 11/2010 | Brunswig et al. | |
| 8,225,223 B2 | 7/2012 | Becerra et al. | |
| 8,650,493 B2 * | 2/2014 | Miller | H04L 12/2697 715/738 |
| 2002/0049962 A1 | 4/2002 | Kelbaugh et al. | |
| 2004/0117769 A1 * | 6/2004 | Lauzon | G06F 11/3664 717/125 |
| 2006/0041564 A1 * | 2/2006 | Jain | G06F 16/50 |
| 2008/0005281 A1 | 1/2008 | Hsueh et al. | |
| 2008/0005793 A1 * | 1/2008 | Wenig | G06F 11/3438 726/22 |
| 2008/0126887 A1 * | 5/2008 | Brodeur | G06F 11/0748 714/57 |
| 2009/0300528 A1 * | 12/2009 | Stambaugh | G06F 3/04817 715/764 |
| 2010/0095208 A1 * | 4/2010 | White | G06F 11/3438 715/704 |
| 2010/0211865 A1 * | 8/2010 | Fanning | G06F 16/9577 715/234 |
| 2011/0238768 A1 | 9/2011 | Habets et al. | |
| 2012/0042237 A1 * | 2/2012 | Armandpour | G06F 11/3672 715/234 |
| 2012/0047427 A1 * | 2/2012 | Hauser | G06F 3/03543 715/234 |
| 2012/0173966 A1 * | 7/2012 | Powell | G06F 16/986 715/234 |
| 2013/0036413 A1 | 2/2013 | Venkatesan et al. | |
| 2013/0086429 A1 * | 4/2013 | Ng | G06F 11/0781 714/38.1 |
| 2013/0132833 A1 * | 5/2013 | White | G06F 3/048 715/704 |
| 2013/0219365 A1 | 8/2013 | Rago et al. | |
| 2013/0311972 A1 | 11/2013 | Supplisson et al. | |
| 2014/0108911 A1 * | 4/2014 | Damale | H04L 67/22 715/234 |
| 2014/0281875 A1 * | 9/2014 | Branton | G06F 17/241 715/230 |
| 2014/0372427 A1 | 12/2014 | Lehmann et al. | |
| 2015/0378561 A1 * | 12/2015 | Ollinger | G06Q 10/06398 707/769 |
| 2016/0170943 A1 * | 6/2016 | Maddali | G06F 16/986 715/234 |
| 2016/0232136 A1 * | 8/2016 | Brust | G06F 17/2247 |
| 2016/0232139 A1 * | 8/2016 | Brust | G06F 17/2247 |
| 2016/0253456 A1 * | 9/2016 | Goede | G06F 19/321 |
| 2017/0017631 A1 * | 1/2017 | Tang | G06F 17/2247 |

OTHER PUBLICATIONS

"Testing Tools—Visual Studio", Microsoft VisualStudio 2013, 4 pages.
European Search Report for European Application 16001589.7, dated Oct. 13, 2016, 9 pages.

* cited by examiner

PAGE-BASED INCIDENT CORRELATION FOR NETWORK APPLICATIONS

TECHNICAL FIELD

This description relates to incident reporting for network applications.

BACKGROUND

Cloud-based software applications refer to network-based applications that deliver content and functionality over a network, generally to a potentially large and diverse set of users. Due to the size and diversity of the users, it is often difficult for a provider of a cloud-based application to identify, address, and correct faults and other incidents experienced by users.

For example, a given cloud-based application may be complex in terms of its construction and/or functionality, and may be provided to users from the general public, or a large number of users within a private enterprise. Users may thus have a wide range of technical knowledge, as well as a wide range of hardware/software platforms used to access the cloud-based application. Moreover, the users will often have diversity with respect to a manner, ability, and willingness to report incidents that may occur with respect to the cloud-based application. Further, the amount of information that may need to be reported may itself be large and complex. For these and related reasons, it is often difficult for the provider of the cloud-based application to capture desired information characterizing an incident experienced by a given user, or even to predict what type or extent of desired information is likely to be captured.

Consequently, it is often difficult for providers to identify a root cause of an incident being investigated, or to quickly and completely resolve or otherwise address user concerns. Similar problems may occur in other contexts, such as during a development and/or testing of a cloud-based application. As a result, users may be dissatisfied with the cloud-based application, and with the provider.

SUMMARY

In the present description, incident data is collected quickly and thoroughly at a user or client side of a cloud application such as a browser application, with minimal involvement from the user. Instead, the incident data is collected, for example, using client-side JavaScript Application Programming Interfaces (APIs) and related techniques in order, for example, to collect a complete HyperText Markup Language (HTML) Document Object Model (DOM) for a page of the browser application, along with device data, performance data, and log data. An annotation tool also may be provided to enable the user to visually annotate the page under investigation, e.g., leveraging native tools available to the user.

Then, a rendering module may be used to render the page in question for analysis by an incident manager, including the annotations. In this way, the incident manager may provide a reproduced or simulated version of the reported incident, along with other collected, relevant incident data. Consequently, the incident manager may effectively analyze the incident and thereby enable quick and complete resolution of the incident for the user.

According to one general aspect, a computer program product is tangibly embodied on a non-transitory computer-readable storage medium and includes instructions that, when executed, are configured to cause at least one computing device to receive an incident report request from a user of a browser running a network application on a client system to thereby provide a page in the browser, and initiate an information collection module of the network application to collect incident data including user interactions with the page, client system features and operations associated with executing the network application, and a document object model (DOM) of the page. The instructions, when executed, are further configured to transmit the incident data to a server-side incident manager, render, using a rendering engine of the server-side incident manager, the document object model, and display, using an incident analyzer of the server-side incident manager, the collected user interactions, and the client system features and operations, and the rendered document object model.

According to another general aspect, a computer-implemented method for executing instructions stored on a non-transitory computer readable storage medium and executable by at least one processor includes receiving an incident report request from a user of a browser running a network application on a client system to thereby provide a page in the browser, and initiating an information collection module of the network application to collect incident data including user interactions with the page, client system features and operations associated with executing the network application, and a document object model (DOM) of the page. The method further includes providing an annotation tool of the network application to receive annotations of the page from the user for inclusion in the incident data, rendering, using a rendering engine, the document object model and the annotations, and displaying the collected user interactions, and client system features and operations, and the rendered document object model and annotations.

According to another general aspect, a system includes instructions recorded on a non-transitory computer-readable storage medium, and executable by at least one processor. The system includes an information collection module configured to receive an incident report request from a user of a browser running a network application on a client system to thereby provide a page in the browser, the information collection module being configured to collect incident data including user interactions with the page, client system features and operations associated with executing the network application, and a document object model (DOM) of the page. The system includes an annotation tool of the network application configured to receive annotations of the page from the user for inclusion in the incident data, and a server-side incident manager configured to receive the incident data. The server-side incident manager includes a rendering engine configured to render the document object model and the annotations, and an incident analyzer configured to display the collected user interactions, and client system features and operations, and the rendered document object model and annotations.

The details of one or more implementations are set forth in the accompanying drawings and the description below. Other features will be apparent from the description and drawings, and from the claims.

DETAILED DESCRIPTION

Figure 1:
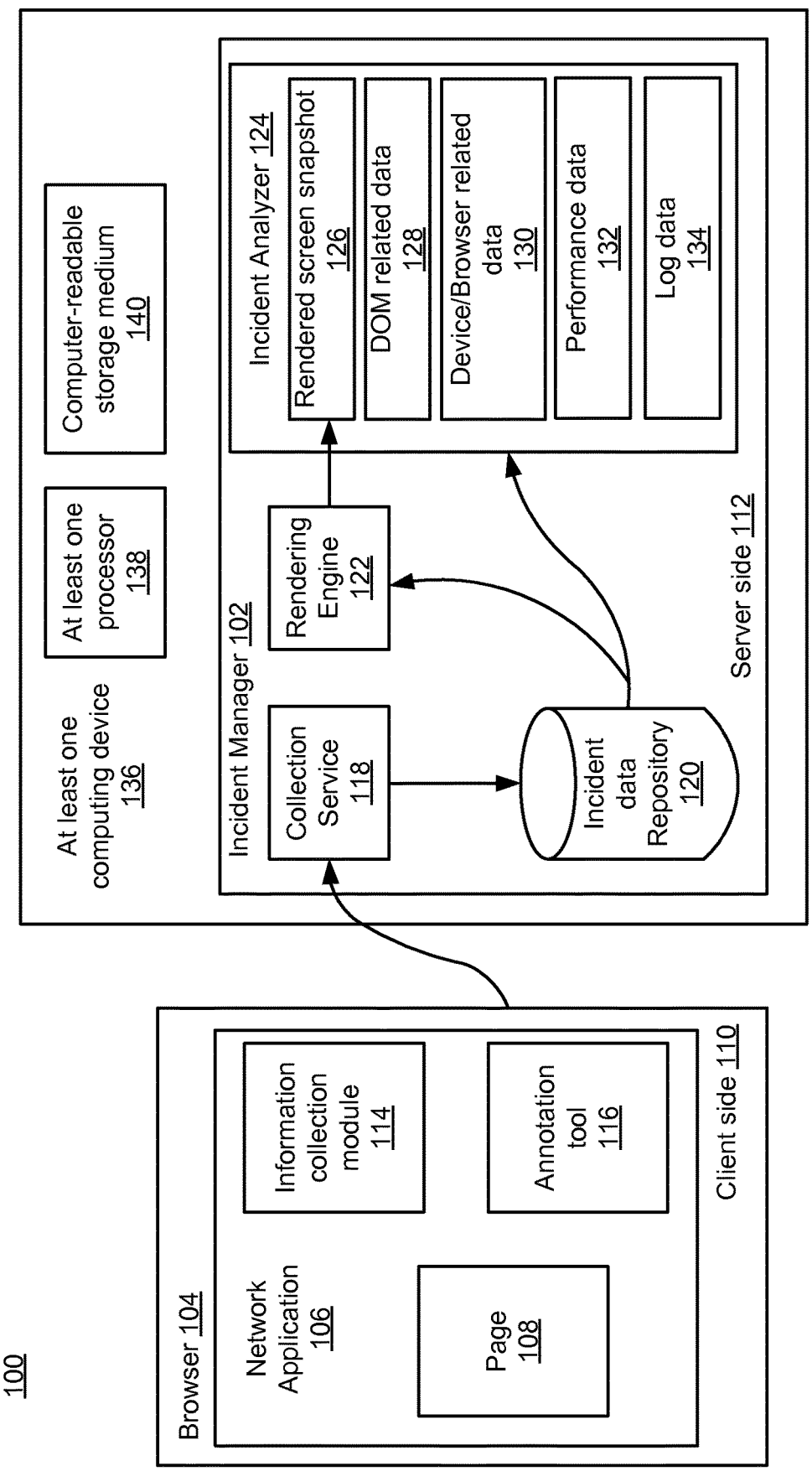
FIG. 1 is a block diagram of a system for page-based incident correlation for network applications.

FIG. 1 is a block diagram of a system 100 for page-based incident correlation for network applications. In the system 100, an incident manager 102 is in communications with a browser 104 running a network application 106, including providing a page 108 within the browser 104. A user, not shown, interacts with the page 108 in order to obtain desired information and/or functionality. When the user experiences an incident, such as a malfunction or perceived malfunction, as described in detail below, the incident may be reported to the incident manager 102 and analyzed, using, in some implementations, both client side 110 and server side 112 components of the incident manager 102. In this way, incidents may be reported and resolved quickly and completely, with minimal demands on both the user and on any human incident resolution personnel (also not shown in FIG. 1) who may be involved in assisting with the reported incident.

In the example of FIG. 1, the browser 104 represents virtually any current or future browser application that is designed, for example, to exchange information over a network, such as the Internet, World Wide Web, or other public or private network. For example, such browsers may be configured to receive input from users, retrieve content from remote computers, render the retrieved content, and receive further input. The browser 104 should also be understood to include virtually any application, even if primarily designed for another purpose (e.g., document processing, or image processing), that is operable to execute the network application 106. Of course, a number of types and examples of browsers are well-known, and conventional features of such browsers are not described here in detail, except as may be necessary or helpful in understanding the system 100 of FIG. 1.

One of the many features and advantages of the browser 104 is its ability to execute the network application 106, which generally refers to an application provided at least partially at the server side 112, without requiring a full installation at the client side 110, or full use of computing resources at the client side 112. Such network applications are often referred to as, or include, cloud-based applications, or web applications. Ideally, the user receives the benefits of the features and functionalities of such applications, without having to install the associated software locally, and with the benefit of having an appropriate or desired quantity of server-side computing resources (typically much greater than the client-side computing resources) allocated for implementation of the network application in question.

Related benefits include the supposed availability of server-side incident resolution personnel or other incident resolution resources, so that users experiencing difficulties with the network application 106 will be able to report incidents and receive assistance in the resolution thereof. However, as network applications become more complex, users often need to provide significant amounts of information to describe the experienced incident, which is time-consuming and inefficient for the users. For example, information that may be helpful for incident resolution might include the following examples, many of which are discussed in more detail below: a current version of an operating system (OS) or device being used, a screen/browser size, browser versions, browser plugins, page history of visited pages, console logs, page opening performance time, and memory usage.

For incidents related to a visual appearance of a page, such as the page 108, users often rely on third-part tools to capture an image of a problematic page or screen. Moreover, it is difficult for users to provide a size (e.g., in pixels) of a screen portion being reported as problematic. Further, with issues related to a performance time of a function of the network application 104, it is difficult for the user to measure accurate performance times using external tools.

Thus, as referenced above, although it is possible, using existing incident reporting tools, for users to describe incidents and even send a screenshot of a problematic page or screen, it is not generally feasible, reliable, efficient, or preferable to expect users to be able to provide all of the types of information that would be helpful for incident resolution, using existing incident reporting techniques. As a result, incident resolution in such circumstances may require multiple iterations of incident reporting, and may be time-consuming and frustrating for both the user and the incident resolution personnel.

The system 100 of FIG. 1 provides a visual communication system for incident reporting, including incident reports from end users (such as customers) as well as various personnel involved in developing, providing, updating, or maintaining the network application 106, such as, for example, quality assurance (QA) testing personnel, project managers, software developers, and software designers. The enhanced visual communication reduces development costs, simplifies alpha/beta testing, and facilitates all user feedback.

As should be apparent from the above discussion, just as the browser 104 represents any current or future browser, the network application 106 represents virtually any known or future application suitable for execution in the context of the client-server architecture of FIG. 1. By way of specific and non-limiting example, the network application 106 may include applications related to business activities or transactions, charitable organizations, governmental/educational activities including schools or libraries, or personal/private applications (e.g., social media applications). Specifically in the realm of business applications, the network application 106 may include applications for consummating transactions, for inventory control, supply chain management, financial management, or human resources activities, to name a few non-exhaustive examples.

Such applications may be executed primarily on the server side 112, meaning, for example, the calculations and other processing are performed there, and that relevant data may be stored there, as well. On the other hand, it is also possible that computing resources at the client side 110 also may be used to execute processing and provide memory for data storage.

In many cases, the browser 104 operates by receiving content or other data of the network application 106 in the form of a mark-up language, such as the Hyper-Text Markup Language (HTML), or the eXtensible Markup Language (XML). The browser 104 then renders the content in a form specified by the corresponding markup language, to thereby provide the page 108. As just referenced above, it often occurs that various types of processing and memory storage for the network application 106 occur at the client side 110.

In other words, for example, the content of the network application 106 is not typically simply static content that is viewed by the user; instead, the content is often highly interactive, and able to accept input from the user and provide a corresponding response. In fact, it is often this type of interactivity that contributes to the types of difficulties in incident reporting referenced herein. Specifically, for example, HTML or XML content delivered to the browser 104 may include a large number of possible actions that a user may take, where these actions depend on one another and represent only a subset of the possible actions, and where the user may mistakenly attempt to take a non-allowed action at any point.

One technique related to providing users with this type of interactive experience in the context of the browser 104 and the page 108 of the network application 106 is known as the document object model (DOM). Generally speaking, a DOM refers to a type of interface, e.g., an Application Programming Interface (API), that enables interaction with a document (used, in conventional nomenclature, in the general sense and including virtually any type of structured data), where such interaction includes, e.g., building documents, navigating document structures, and adding, modifying, or deleting elements and content.

A DOM typically resembles the underlying document that is being modeled, but with a standardized structure and format, that is language-independent and compatible with many different contexts and platforms (e.g., different types of browsers), and that utilizes objects in the normal sense of the term object in object-oriented programming. For example, a DOM may represent discrete document elements and relationships therebetween, using a tree structure, and may define methods for acting on such elements and relationships.

When a browser, such as the browser 104, receives, e.g., HTML content, a layout engine of the browser typically parses the HTML to create a corresponding DOM, and to thus render the page 108. As the user interacts with the page 108, the DOM is often modified correspondingly.

In the system 100 of FIG. 1, an information collection module 114 of the network application 106 is configured to capture a DOM of the page 108, e.g., in response to an incident report from the user, for use in facilitating an incident response thereto, as described in detail, below. That is, the information collection module 108 captures a current state of the DOM during a timeframe associated with the incident reporting by the user, as one technique for capturing relevant incident data.

The information collection module 114 is further operable to collect device data related to the client side 110 device used to implement the browser 104. As referenced above, such device data may include OS-related information including type and version, and information about the hardware of the client side device. Device data may further include device-specific information characterizing a screen and/or browser size, as well as a type and version of the browser, and any associated browser plugins, extensions, or add-ons that may be present. The information collection module 114 also may collect performance data, including a performance of the browser 104 during visit(s) to the page 108 and related pages, such as a page opening performance time and associated memory usage, as well as various types of log data. Examples of such log data, as well as further operations of the information collection module 114, in general, are described in more detail, below, e.g., in conjunction with FIG. 2.

Also illustrated at the client side 110 is an annotation tool 116. As described herein, the annotation tool 116 allows the user of the browser 104 to annotate the page 108 in conjunction with the incident being reported, using, e.g., highlighting, blackouts, arrows, pixel rulers, or virtually any type of visual marker to identify and/or characterize a visual element associated with the incident being reported. Again, further details of the annotation tool 116 are provided below, e.g., in conjunction with FIG. 5.

In the example of FIG. 1, all incident data collected by the information collection module 114 and the annotation tool 116 is transmitted to a collection service 118 of the incident manager 102 at the server side 112. The incident data is then stored using, in the example, an incident data repository 120.

A rendering engine 122 is then able to retrieve the captured DOM and re-render the page 108, as well as corresponding annotations, for use by an incident analyzer 124. That is, as shown, the incident analyzer 124 receives a rendered screen snapshot 126 that illustrates the page 108 as experienced by the user during the incident in question, including any annotations captured using the annotation tool 116. Further example operations of the rendering engine 122 are provided below, e.g., with respect to FIG. 3.

The incident analyzer 124 may also retrieve the various types of incident data referenced above. For example, as shown, the incident analyzer 124 may access additional DOM related data 128, such as the complete DOM and data characterizing the DOM, including a DOM element or node count, or a depth of a DOM tree or other structure details for the DOM. As also shown, the incident analyzer 124 may retrieve device/browser related data 130, performance data 132, and log data 134. Additional details regarding operations of the incident analyzer 124 with respect to the use (e.g., display and analysis) of the incident data 120 are provided below, e.g., with respect to FIG. 4.

In the example of FIG. 1, the incident manager 102 is illustrated as being executed using at least one computing device 136, which includes at least one processor 138 and a non-transitory computer readable storage medium 140. That is, for example, the at least one computing device 136 may represent two or more computing devices, perhaps communicating over a computer network or other communications interface. Similarly, the at least one processor 138 may represent two or more processors, perhaps executing in parallel to provide the incident manager 102 in an efficient and convenient manner. The non-transitory computer readable storage medium 140 may represent any suitable storage medium capable of storing instructions for execution by the at least one processor 138, and/or any relevant or required data, such as the incident data of the incident data repository 130.

Of course, the system 100 of FIG. 1 is intended merely as a simplified illustration of the hardware and software that may be necessary or useful in implementing the incident manager 102. As referenced above, appropriate hardware and software may be included in the system 100, although not explicitly illustrated in the simplified example of FIG. 1, such as a monitor or other appropriate display or screen that may be used to provide the browser 104, where such details will vary depending on a nature of the underlying computing device(s) used at the client side 110 (e.g., a workstation, desktop, laptop, netbook, notebook, tablet, or smartphone). Although such hardware is not explicitly illustrated as such in the simplified example of FIG. 1, various implementations of the system 100 may include these or other examples of hardware/software platforms. Moreover, although the information collection module 114 and the annotation tool 116 are illustrated at the client side 110, while the rendering engine 122, incident data repository 120, and incident analyzer 124 are illustrated at the server side 112, it is possible that some or all of any one of these various components may be implemented partially or completely at the opposite side of the client-server relationship of FIG. 1. Many other variations of implementations of the system 100 are described below, or would be apparent.

Figure 2:
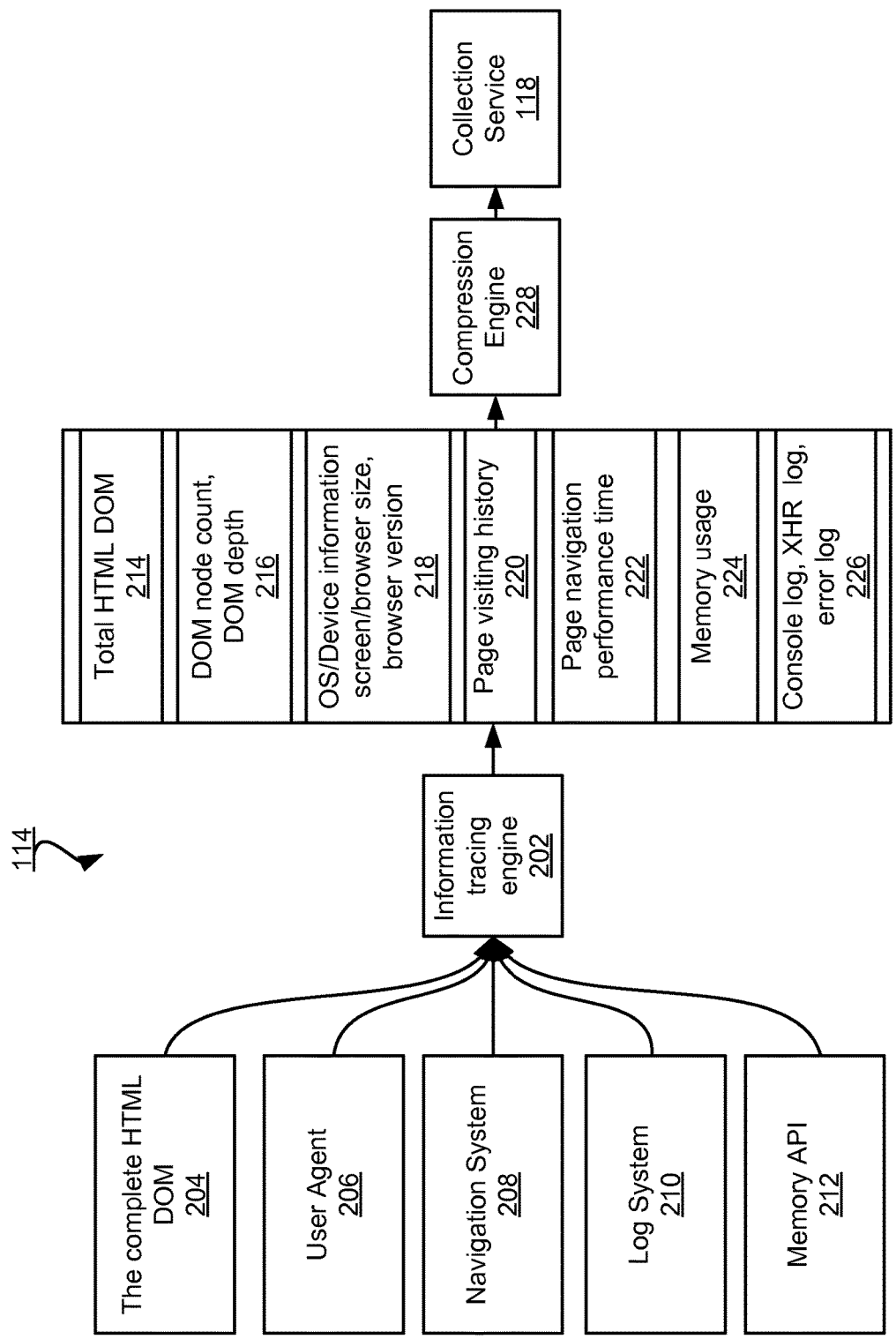
FIG. 2 is a block diagram of an information collection module of the system of FIG. 1.

FIG. 2 is a block diagram of the information collection module 114 of the system of FIG. 1. In the example of FIG. 2, an information tracing engine 202 represents a client-side API configured to capture the types of incident data referenced above. For example, JavaScript APIs may be used to implement the information tracing engine 202, where JavaScript refers to the known dynamic programming language that executes runtime programming behaviors to control operations of the browser 104. Thus, the JavaScript APIs of the information tracing engine 202 refer to APIs for interfacing between such JavaScript and the browser 104 in rendering the page 108.

Further, the information tracing engine 202 may utilize a RESTful service, where REST refers to REpresentational State Transfer as a software architectural approach that provides techniques for implementing scalable web services. REST typically utilizes the Hyper Text Transfer Protocol (HTTP) typically used over the Internet to transfer HTML documents, and is therefore highly compatible with the context of the system 100 of FIG. 1, including the use of HTTP commands for retrieving and transmitting data, such as GET, POST, PUT, and DELETE, as referenced below.

Thus, the information tracing engine 202 may interface with a number of components and data sources to collect the incident data described herein. For example, as shown, the information tracing engine 202 may use JavaScript APIs to interface with the complete HTML DOM 204.

Further, a user agent 206 refers to software performing on behalf of the user, including, e.g., a string or line of text identifying the browser 104, the relevant OS, and other relevant types of incident data. A navigation system 208 refers to a navigation system of the browser 104 that enables the user to move from page to page within the Internet (including the page 108), and within the network application 106, so that the navigation system 208 may provide, e.g., a navigation history of the user.

A log system 210 may refer to one or more types of log systems for collecting log data. For example, a browser console generally refers to a debugging or error console of the browser 104, where such consoles are known to vary somewhat by browser type. In general, such console log information associated with a regular webpage, such as network requests, security warnings, or any informational messages, are explicitly logged by JavaScript being executed. Thus, using appropriate JavaScript APIs as referenced above, the information tracing engine 202 may interface with the console of the browser 104 and obtain logged data thereof characterizing, e.g., any error, debugging, or troubleshooting messages contained therein. Meanwhile, an XML HTTP REQUEST (XHR) refers to an API used by scripting languages such as JavaScript to send HTTP (or secured HTTP (HTTPS)) requests to a server, and to receive and load any response from the server back into the script being used. Therefore, an XHR log refers to a type of log system for tracking and storing such requests/response pairs. Other error logs, such as an error log characterizing a call stack data structure storing information about active routines or sub-routines of the browser 104, also may be utilized.

As a final example of interfacing activities of the information tracing engine 202, a memory API 212 is illustrated that may be accessed by the information tracing engine 202 to obtain various types of incident data related to memory usage at the client side 110 (e.g., memory requirements of the browser 104). For example, as referenced above, such memory data may relate to an amount of memory being used to execute active processes of the browser 104 in providing the network application 106 and the page 108.

Thus, as described above with respect to FIG. 1, but illustrated in more detail in the example of FIG. 2, various types of incident data may be collected at the information collection module 114. For example, as shown, the total HTML DOM 214 may be collected, along with a total DOM node count and DOM depth (216). Further, a device related incident data 218 regarding the operating system, device hardware, screen/browser size, and browser version may be collected. Page visiting history 220 and page navigation performance time 222 also may be collected. Finally in the example of FIG. 2, memory usage 224 and log data 220 (including console log data, XHR log data, and error log data) may be obtained.

Using the RESTful service architecture referenced above, a compression engine 228 may compress the various types of incident data 214-226. The compression engine 228 may thereby POST the compressed incident data to the collection service 118 at the service side 112.

In practice, the network application 106 may be provided with one or more selection options for initiating an incident report. For example, a button or other icon or widget of the network application 106 may be displayed by the browser 104 within the page 108, and the user may thus initiate an incident report simply by selecting the corresponding incident report element of the page 108. For example, in some implementations, a single selection of the incident report element of the page 108 may execute reporting of the incident data to the incident manager 102. In other example implementations, a first selection of the incident reporting element may initiate collection of incident data, while at least a second selection of the incident reporting element may cause a completion of the collection of the incident data and corresponding reporting thereof to the collection service 118.

It may be observed that the information collection module 114 is operable to collect the incident data without requiring a plugin or other third-party tool. In particular, with respect to the annotation tool 116, as described below with respect to FIGS. 3-5, a separate screenshot capture tool for capturing a current display of the browser 104 is not required, since the rendering engine 122 of the incident manager 102 is capable of providing the rendered screen snapshot 126 of FIG. 1. Nonetheless, the incident manager 102 may be compatible with the existing third-party incident reporting tools, as well as with third-party tools designed to enable developers to plan and implement software development.

Figure 3:
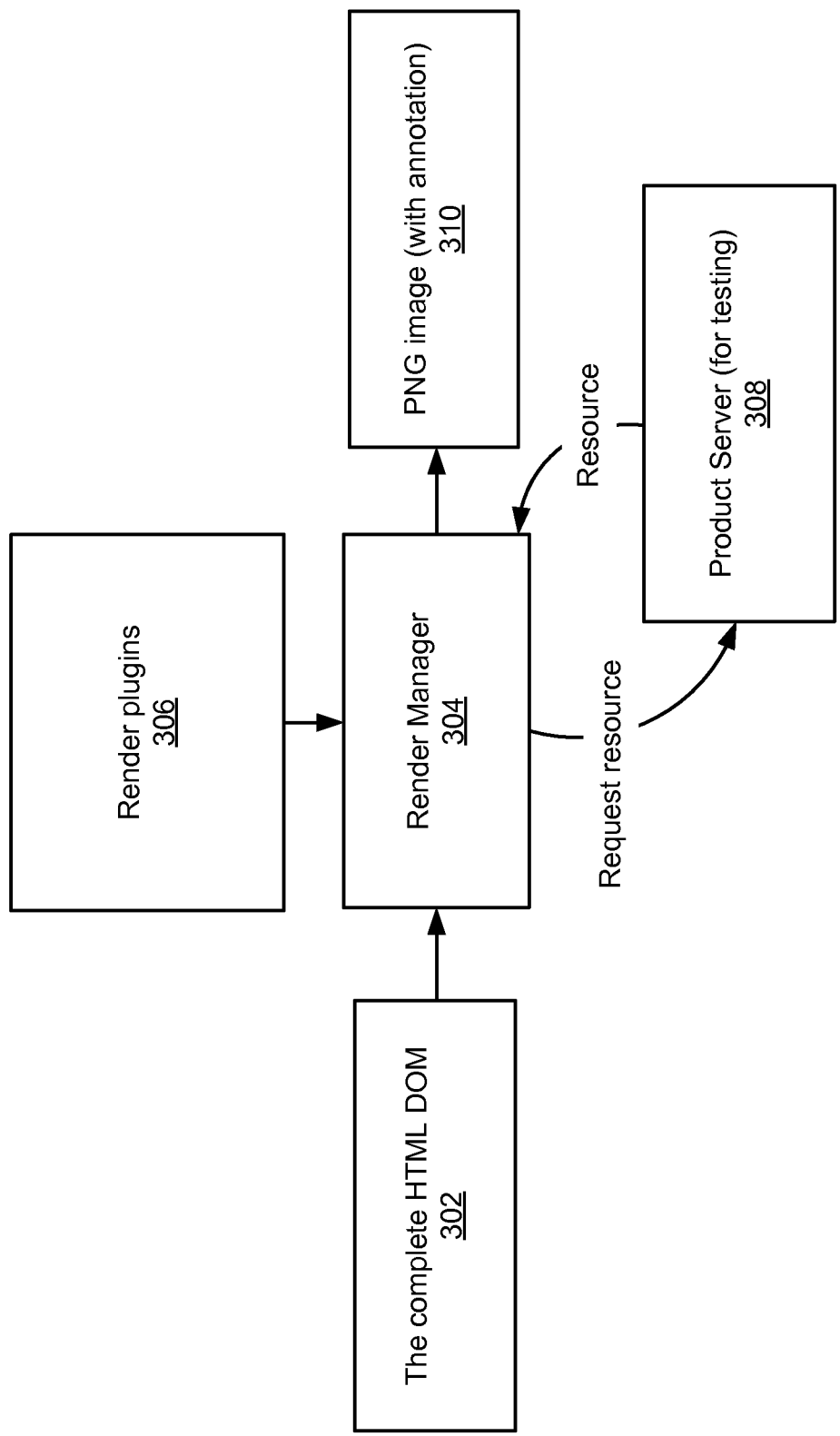
FIG. 3 is a block diagram of a rendering engine of the system of FIG. 1.

FIG. 3 is a block diagram of the rendering engine 122 of the system 100 of FIG. 1. As described above, and illustrated in FIG. 3, a complete HTML DOM of the page 108 may be provided to a render manager 304 as part of the incident data obtained by the information collection module 114. The render manager 304 may utilize one or more suitable render plugins 306 to assist in re-rendering the page 108. For example, although the simplified examples above refer to the page 108 being constructed using HTML and/or XML, various additional or alternative techniques may be used to construct the page 108, such as cascading style sheets (CSS), and particular corresponding render plugins 306 may be utilized to facilitate rendering specific types of such content.

Further, the render manager 304 may interact with a separate product server 308 such as by requesting a resource therefrom, and receiving a response to the resource request, as shown. In other words, for example, in scenarios in which the user of the page 108 interacted with a particular server during use of the page 108, such interactions may be captured within the HTML DOM 302. Then, in order to re-render the user's interaction, the render manager 304 may re-execute the actual request/response pair experienced by the user.

In this way, the render manager 304 may obtain all necessary information to render the page 108 as an image 310. In the example of FIG. 3, the image 310 is illustrated as a portable network graphics (PNG) image. But of course, other image formats may be used, such as jpeg, gif, or pdf.

As illustrated in the example of FIG. 3, the resulting image 314 may be rendered together with annotation information captured by the annotation tool 116. Specific techniques for executing such rendering are provided below, with respect to FIG. 5.

Figure 4:
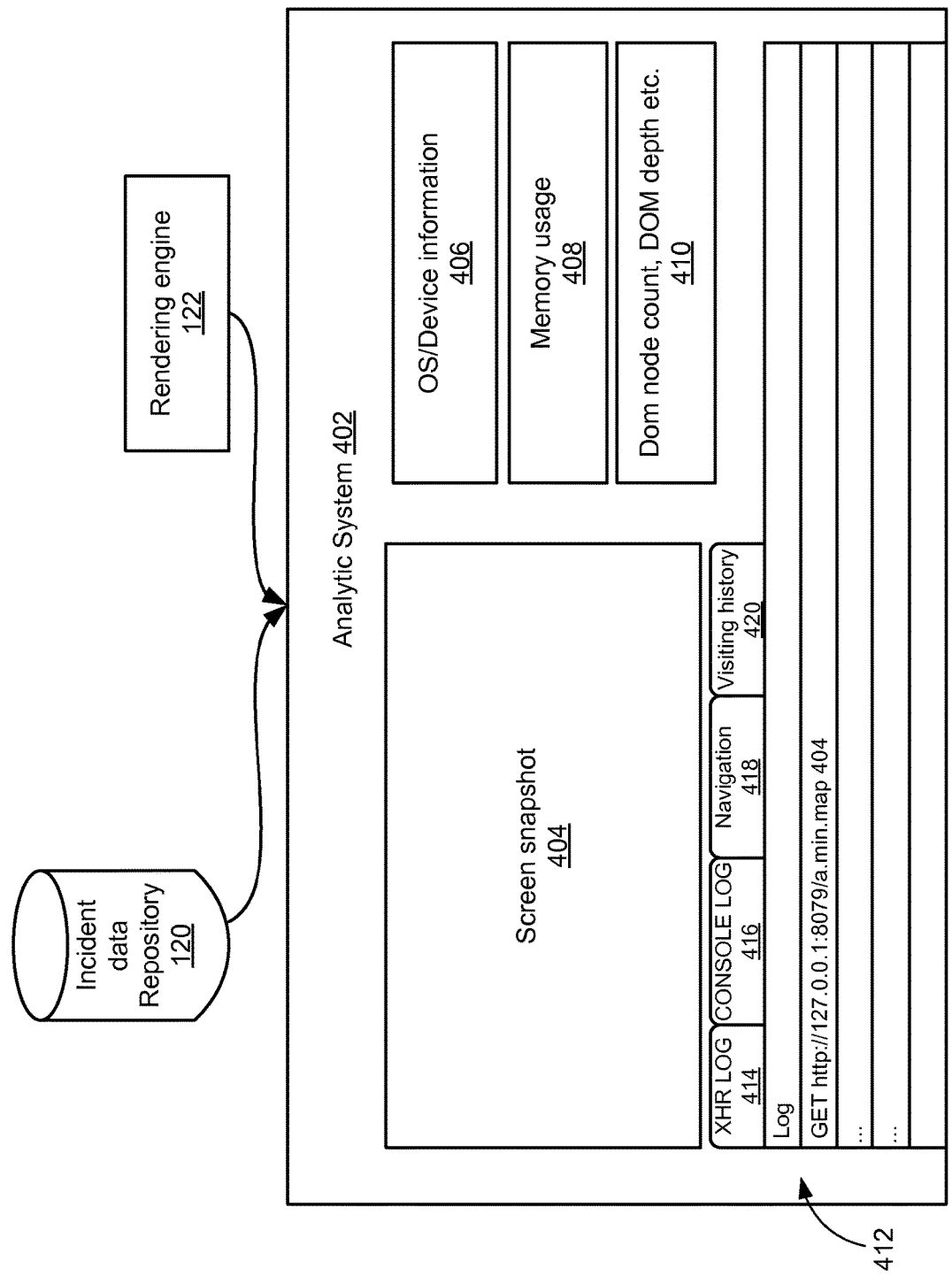
FIG. 4 is a screen shot of an incident analysis page provided by an incident analyzer of the system of FIG. 1.

FIG. 4 is a screenshot of an incident analysis page 402 provided by the incident analyzer 124 of the system 100 of FIG. 1. That is, as referenced above, the incident analyzer 124 is configured to manage collected incident data, and assist a developer or other incident response personnel in analyzing the reported incident, and ultimately collaborating with the user (e.g., a co-developer or customer) to resolve the reported incident.

In the example of FIG. 4, as shown, the incident data repository 120 and the rendering engine 122 provide all required data for the incident analyzer 124 to generate the incident analysis screen 402. As illustrated, a screen snapshot 404 includes the re-rendered webpage provided the rendering engine 122, along with any annotations provided by the user through the use of the annotation tool 114. Further in the example, OS/device information is provided in a portion 406. Memory usage is provided in portion 408, and DOM information (e.g., a DOM node count or DOM depth) is provided in a portion 410.

Finally in the example of FIG. 4, a portion 412 illustrates additional types of incident data and corresponding formats and techniques for displaying such incident data within the context of the example incident analysis screen 402. As shown, a portion 412 for displaying log data includes a number of tabs that are each selectable by the incident response personnel for viewing corresponding log data. As shown, a tab 414 is associated with the XHR log, while a tab 416 is associated with the console log. Meanwhile, a tab 418 includes a navigation history of the user with respect to the page 108, and a tab 420 logs data related to a page visiting history of the user in conjunction with visiting the page 108.

Figure 5:
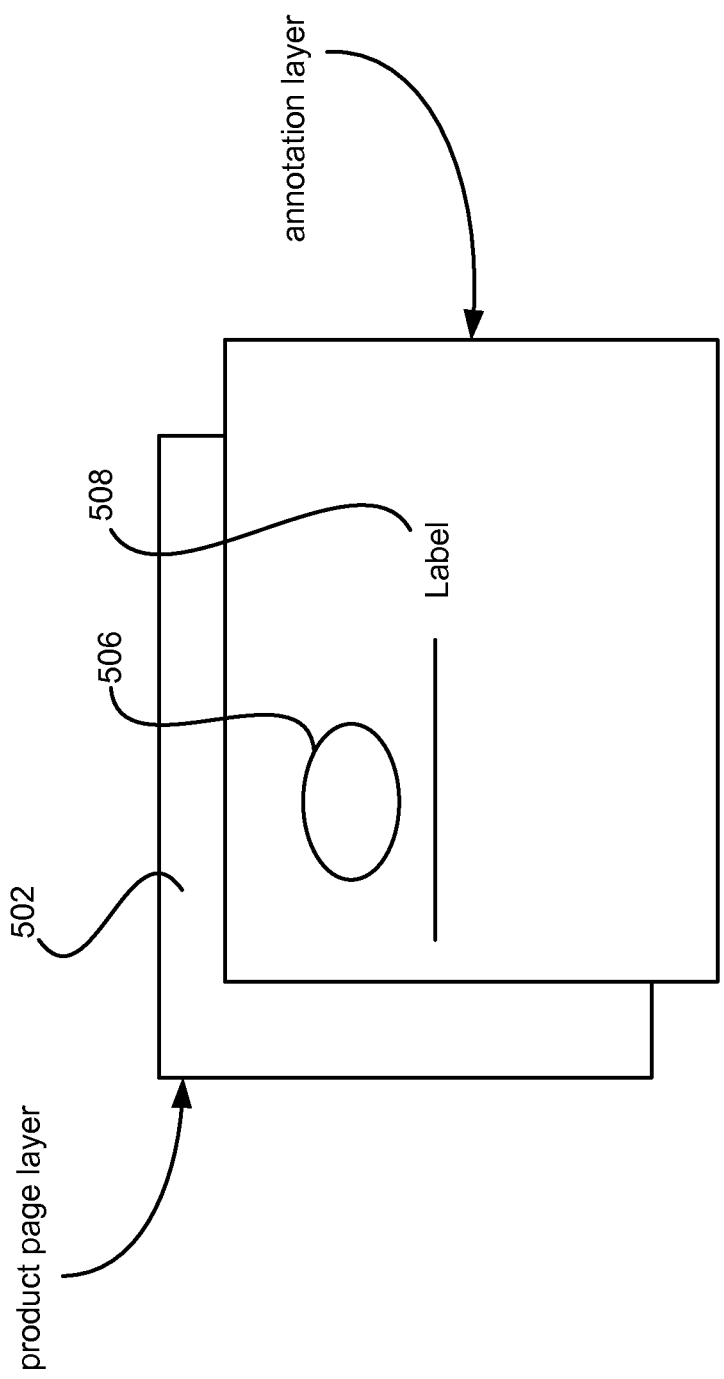
FIG. 5 illustrates example operations of an annotation tool of the system of FIG. 1.

FIG. 5 illustrates example operations of the annotation tool 114 of the system 100 of FIG. 1. In the example of FIG. 5, scalable vector graphics (SVG) is used by the annotation tool 114 to enable a user of a product page layer 502 (corresponding generally to the page 108 of FIG. 1) to create an annotation layer 504 for providing the types of annotations referenced above. In this context, SVG generally refers to an XML-based image format for 2D graphics, in which images are defined using XML text files. Thus, for example, annotation tool 114 may enable creation of annotations by the user, using text entry and/or corresponding drawing software.

In the example of FIG. 5, an ellipse 506 illustrates an example of a type of marking that a user might provide to specifically identify an area of the underlying page associated with the incident being reported. Similarly, a label 508 illustrate that the user is provided with an ability to provide a text entry characterizing a specific page portion associated with the incident being reported.

Thus, as shown in FIG. 5, the annotation layer 504 may be overlaid with the underlying product page layer 502 to provide a seamless, integrated annotation of desired page portions. The rendering engine 122 may thus render both layers 502, 504, e.g., within the screen snapshot 404 of FIG. 4.

Figure 6:
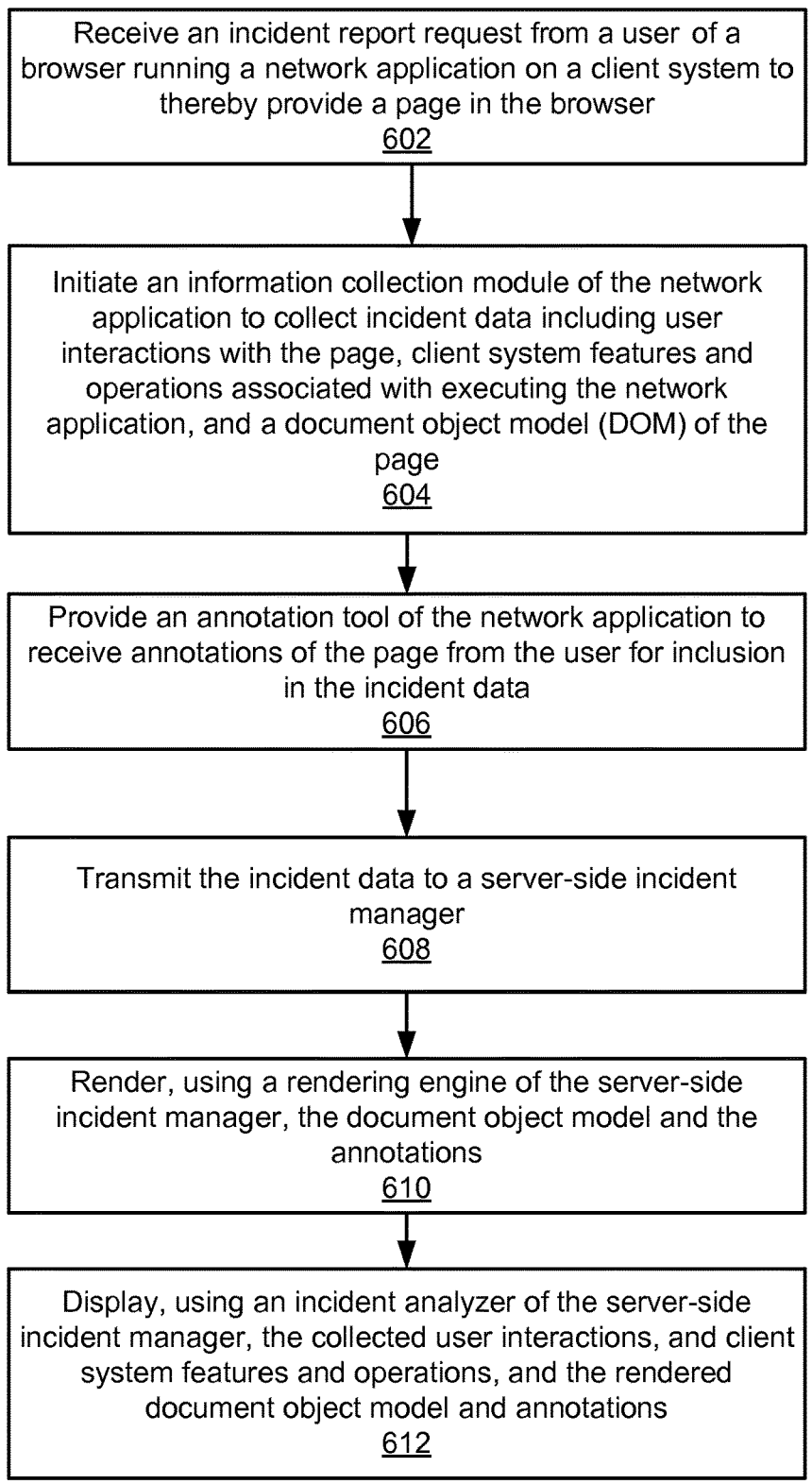
FIG. 6 is a flowchart illustrating example operations of the system of FIG. 1.

FIG. 6 is a flowchart illustrating example operations of the system 100 of FIG. 1, using the features and techniques of FIGS. 2-5. In the example of FIG. 6, operations 602-612 are illustrated as separate, sequential operations. However, in various implementations, additional or alternative operations or sub-operations may be included, and/or illustrated operations or sub-operations may be omitted, and all such variations of included operations and sub-operations may be executed at least partially in a parallel manner, or in an iterative, branched, looped, or nested fashion.

In the example of FIG. 6, an incident report is received from the user of a browser running a network application on a client system to thereby provide a page in the browser (602). For example, as described, the user of the browser 104 at the client side 110 may utilize the network application 106 to visit the page 108. The user may send an incident report to the incident manager 102, e.g., to the information collection module 114.

Then, an information collection module of the network application may be initiated to collect incident data including user interactions with the page and client system operations associated with executing the network application (604). For example, the information collection module 114 may collect the various types of incident data already described above, such as the incident data stored within the incident data repository 120 after having been obtained by the information tracing engine 202 of FIG. 2.

An annotation tool of the network application may be provided to receive annotations of the page from the user (606). For example, annotation tool 116 may be provided to enable the user to generate the SVG-based annotation layer 504 of FIG. 5.

With regard to both the information collection module 114 and the annotation tool 116, it will be appreciated that these elements may be integrated within the network application 106, thereby providing a type integration with the network application framework, and enabling collection and transmission of a large amount and variety of incident data, without requiring third-party plugins or tools. Consequently, the incident data may be collected quickly, efficiently, and completely.

The incident data may then be transmitted to a server side incident manager (608). For example, as described above with respect to FIG. 2, a compression engine 228 may be configured to compress the various types of incident data 214-226 for transmission to the collection service 118 of the incident manager 102.

Using a rendering engine of the server side incident manager, the document object model and the annotations may be rendered (610). For example, the rendering engine 122 of the incident manager 102 may render collected HTML, XML, and SVG data (along with any other data included within the DOM), to thereby provide an image of the page 108 and any associated annotations.

Using an incident analyzer of the server side incident manager, the collected user interactions and client system operations and features may be displayed, together with the rendered document object model and annotations (612). For example, the incident analyzer 124 may provide the screenshot 402, including the rendered screen snapshot of the page 108 and associated annotations illustrated in the portion 404 thereof, as described above with respect to FIG. 4. In this way, as described, the incident analyzer 124 provides all necessary incident data for the reported incident in a manner that is convenient for the incident response personnel, including, e.g., essentially reproducing the incident in question within the simulated environment of the screenshot 402.

In various implementations, the incident response personnel may thereafter use appropriate communication techniques to communicate with the user in taking further steps to resolve the incident. In some implementations, automated incident analysis and resolution techniques may be utilized, as well.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:

receive an incident report request for an incident from a user of a browser running a network application on a client system to thereby provide a page in the browser, the network application being provided at least partially by a first server, the incident report request being initiated by the user after the incident, wherein the incident report request is initiated after the incident by making a first selection of an incident reporting element displayed by the browser running the network application on the client system;

responsive to the first selection of the incident reporting element displayed by the browser running the network application on the client system, initiate an information collection module of the network application to collect incident data, the incident data including interactions of the user who initiated the incident report request with the page that caused corresponding modifications of a document object model (DOM) of the page during a timeframe of the incident as well as client system features and operations associated with executing the network application, wherein the incident data captures an interaction between the client system and a second server, the interaction comprising a request/response pair, the second server being a product server that is different from the client system and the first server;

capture, using an annotation tool of the network application, annotations of the page for inclusion in the incident data, the annotations created, in conjunction with the incident being reported, by the user who initiated the incident report request;

transmit the incident data to a server-side incident manager at the first server;

render, from the incident data and using a rendering engine of the server-side incident manager, the document object model as an image file including overlaid illustrations of the annotations received from the user who initiated the incident report request, wherein rendering the document object model includes re-executing the captured request/response pair with the second server in a context of the incident; and display in a re-rendered page, using an incident analyzer of the server-side incident manager, the collected interactions, the collected client system features and operations, and the rendered image file, synchronized with one another to provide server-side incident support.

2. The computer program product of claim 1, wherein the annotations are collected using a scalable vectors graphic (SVG) layer.

3. The computer program product of claim 1, wherein the information collection module of the network application is configured to collect the incident data including interfacing with at least one log system of the client system.

4. The computer program product of claim 1, wherein the information collection module of the network application is configured to collect the incident data including interfacing with at least one navigation system of the browser to collect a navigation history of the user with respect to the page.

5. The computer program product of claim 1, wherein the information collection module of the network application is configured to collect the incident data including interfacing with at least one memory application programming interface (API) to collect an amount of memory resources consumed in conjunction with the client system features and operations associated with executing the network application.

6. A computer-implemented method for executing instructions stored on a non-transitory computer readable storage medium and executable by at least one processor, the method comprising:

receiving an incident report request for an incident from a user of a browser running a network application on a client system to thereby provide a page in the browser, the network application provided at least partially by a first server, the incident report request being initiated by the user after the incident;

initiating an information collection module of the network application to collect incident data, the incident data including interactions of the user who initiated the incident report request with the page that caused corresponding modifications of a document object model (DOM) of the page during a timeframe of the incident as well as client system features and operations associated with executing the network application, the client system features and operations comprising page opening performance time and associated memory usage, the incident data capturing an interaction between the client system and a second server, the interaction comprising a request/response pair, the second server being a product server that is different from the client system and the first server;

capturing, using an annotation tool of the network application, annotations of the page that characterize the incident for inclusion in the incident data, the annotations created, in conjunction with the incident being reported, by the user who initiated the incident report request;

rendering, from the incident data and using a rendering engine, the document object model as an image file including overlaid illustrations of the incident-characterizing annotations created by the user who initiated the incident report request, wherein rendering the document object model includes re-executing the captured request/response pair with the second server in a context of the incident; and displaying, in a re-rendered page, the collected interactions, the collected client system features and operations, and the rendered image file, synchronized with one another to provide server-side incident support.

7. The method of claim 6, wherein the annotations are collected using a scalable vectors graphic (SVG) layer.

8. The method of claim 6, wherein the information collection module of the network application is configured to collect the incident data including interfacing with at least one log system of the client system.

9. The method of claim 6, wherein the information collection module of the network application is configured to collect the incident data including interfacing with at least one navigation system of the browser to collect a navigation history of the user with respect to the page.

10. The method of claim 6, wherein the information collection module of the network application is configured to collect the incident data including interfacing with at least one memory application programming interface (API) to collect an amount of memory resources consumed in conjunction with the client system features and operations associated with executing the network application.

11. The method of claim 6, comprising transmitting the incident data to a server-side incident manager configured to provide the rendering and the displaying.

12. A system including instructions recorded on a non-transitory computer-readable storage medium, and executable by at least one processor, the system comprising:

an information collection module configured to receive an incident report request for an incident from a user of a browser running a network application on a client system to thereby provide a page in the browser, the network application being provided at least partially by a first server, the incident report request being initiated by the user after the incident, wherein the user initiates the incident report request by making a first selection of an incident reporting element displayed by the browser running the network application on the client system, and the information collection module being configured to collect incident data responsive to the first selection of the incident reporting element by the user, the incident data including interactions of the user who initiated the incident report request with the page that caused corresponding modifications of a document object model (DOM) of the page during a timeframe of the incident as well as client system features and operations associated with executing the network application, the client system features and operations comprising operating system information, page opening performance time and associated memory usage, the incident data capturing a request/response pair of an interaction between the client system and a second server, the second server being a product server that is different from the client system and the first server;

an annotation tool of the network application configured to capture annotations of the page that characterize the incident for inclusion in the incident data, the annotations created, in conjunction with the incident being reported, by the user who initiated the incident report request; and a server-side incident manager at the first server, the server-side incident manager being configured to receive the incident data and further including a rendering engine configured to render, from the incident data, the document object model as an image file including overlaid illustrations of the incident-characterizing annotations created by the user who initiated the incident report request, wherein rendering the document object model includes re-executing the captured request/response pair of the interaction with the second server in a context of the incident, and an incident analyzer configured to display, in a re-rendered page, the collected interactions, the collected client system features and operations, and the rendered image file, synchronized with one another to provide server-side incident support.

13. The computer program product of claim 1, wherein transmission of the incident data to the server-side incident manager is executed automatically after the first selection of the incident reporting element by the user.

14. The computer program product of claim 1, wherein transmission of the incident data to the server-side incident manger is triggered by a second selection of the incident reporting element by the user.

15. The system of claim 12, wherein the server-side incident manager is configured to receive the incident data automatically after the first selection of the incident reporting element by the user.

16. The system of claim 12, wherein the server-side incident manager is configured to receive the incident data after a second selection of the incident reporting element by the user.

* * * * *